United States Patent
Chung

(10) Patent No.: US 8,123,320 B2
(45) Date of Patent: Feb. 28, 2012

(54) ARRAY-TYPE IMAGE FORMING APPARATUS AND METHOD TO COMPENSATE IMAGE DENSITY

(75) Inventor: Jin-tae Chung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 12/255,791

(22) Filed: Oct. 22, 2008

(65) Prior Publication Data

US 2009/0167799 A1    Jul. 2, 2009

(30) Foreign Application Priority Data

Dec. 28, 2007    (KR) .................. 10-2007-0140763

(51) Int. Cl.
*B41J 2/205* (2006.01)
*B41J 29/38* (2006.01)

(52) U.S. Cl. .................. 347/15; 347/9; 347/12; 347/13; 347/19; 347/40; 347/42; 358/3.1; 358/3.12

(58) Field of Classification Search ............... 347/15, 347/19; 358/3.1, 3.12
See application file for complete search history.

(56) References Cited

U.S. PATENT DOCUMENTS

2004/0046981 A1 *   3/2004   Taka et al. ................. 358/1.9
* cited by examiner

*Primary Examiner* — Ryan Lepisto
(74) *Attorney, Agent, or Firm* — Stanzione & Kim, LLP

(57) ABSTRACT

An array-type image forming apparatus and a method for compensating an image using the same include an image density determination unit to determine the image density of each line on a page, a storage unit stores one or more threshold values and a control unit compensates the image density by comparing the determined image density of each line and the threshold value. When the image density reaches the threshold value, the control unit modifies the amount of heat supplied to a print head, thus modifying the amount of ink applied to subsequent lines on the page, in order to provide compensation for the image density.

25 Claims, 4 Drawing Sheets

Pulse_n-1 > Pulse_n (n IS A POSITIVE INTEGER)

ARRAY-TYPE IMAGE FORMING APPARATUS AND METHOD TO COMPENSATE IMAGE DENSITY

CROSS-REFERENCE TO RELATED APPLICATIONS

This application claims priority under 35 U.S.C. §119(a) from Korean Patent Application No. 10-2007-0140763, filed on Dec. 28, 2007, in the Korean Intellectual Property Office, the disclosure of which is incorporated herein by reference in its entirety.

BACKGROUND OF THE INVENTION

1. Field of the Invention

The present general inventive concept relates to an array-type image forming apparatus and a method to compensate an image using the same. More particularly, the present general inventive concept relates to an array-type image forming apparatus which compensates an image by changing a fire strobe pulse of power which is necessary to drive nozzles of a print head, and a method to compensate an image during its formation.

2. Description of the Related Art

An array-type image forming apparatus sprays droplets of ink onto a sheet of paper using nozzles on a print head having a width greater than that of the paper. There are diverse manners of spraying ink using nozzles, among which the most widely employed method consists of heating the nozzles of the print head. The print head sprays ink onto a sheet of paper corresponding to a print command signal by selectively driving a switching element and a heater according to the print command signal output from the array-type image forming apparatus. The print head mounted on an ink cartridge includes a plurality of head chips having a plurality of nozzles. If the image forming apparatus supports color images, the head chip includes nozzles for cyan, magenta, yellow, and black.

The plurality of head chips is temperature-sensitive. If the conventional array-type image forming apparatus continues printing, the plurality of nozzles of each head chip is heated to spray ink, so due to heat, an image may become degraded and image density may change. For example, referring to FIG. 1A, when an image having the same single pattern is printed, if dot A on the first printed line is compared with dot B on the last printed line, dot B increases in density from d to d'. In addition, referring to FIG. 1B, if dot C in an area having high image density is compared with dot D in an area having comparatively low image density, dot C is printed larger than dot D since the temperature of the head chip changes, and thus the size of dots changes when spraying ink onto the area having a high image density.

SUMMARY OF THE INVENTION

The present general inventive concept provides an array-type image forming apparatus which prevents image density from changing due to a change in the temperature of a head chip leading to a change in the size of dots, and a method to compensate an image during its formation.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an array-type image forming apparatus including an image density determination unit to determine the image density of each line on a page, a storage unit to store one or more threshold values to determine whether to compensate image density and a control unit to compensate the image density by comparing the determined image density of each line and the threshold value.

The storage unit may store a reference value based on which the image density of each line is determined to be high or low, a first threshold value which is the allowable number of lines having a high image density and a second threshold value which is the allowable number of lines having a low image density.

The control unit may count the number of lines having an image density higher than the reference value and compensate the image density if the counted number of lines reaches the first threshold value.

The control unit may compensate the image density if there are lines having a high image density which are repeated successively until the first threshold value is counted, or if the number of lines having a high image density in a certain area reaches the first threshold value.

The control unit may count the number of lines having an image density lower than the reference value and compensate the image density if the counted number of lines reaches the second threshold value.

The control unit may compensate the image density if there are lines having a low image density which are repeated successively until the second threshold value is reached, or if the number of lines having a low image density in a certain area reaches the second threshold value.

The control unit may reset the counted number of lines if one page has been printed completely.

The control unit may compensate the image density by changing a fire strobe pulse.

The apparatus may further include an output unit to notify a user that the image has been compensated by displaying or printing a message.

The foregoing and/or other aspects and utilities of the present general inventive concept may be achieved by providing a method to compensate an image using an array-type image forming apparatus, the method including determining the image density of each line on a page, and compensating the image by comparing the determined image density of each line with at least one threshold value to determine whether to compensate image density at each line.

In the compensating operation, the number of lines having an image density higher than the reference value may be counted, and the forming image may be compensated if the counted number of lines reaches a first threshold value, wherein the first threshold value is the allowable number of lines having a high image density.

In the compensating operation, the image may be compensated if there are lines having a high image density which are repeated successively until the first threshold value is reached, or if the number of lines having a high image density in a certain area reaches the first threshold value.

In the compensating operation, the number of lines having an image density lower than the reference value may be counted, and the image may be compensated if the counted number of lines reaches a second threshold value, wherein the second threshold value is the allowable number of lines having a low image density.

In the compensating operation, the image may be compensated if there are lines having a low image density which are repeated successively until the second threshold value is reached, or if the number of lines having the low image density in a certain area reaches the second threshold value.

The method may further include resetting the counted number of lines if one page has been printed completely.

In the compensating operation, the image may have been compensated by changing a fire strobe pulse.

The method may further include notifying a user that the image is compensated, by displaying or printing a message.

The foregoing and/or other aspects and utilities of the present general inventive concept may be achieved by providing a method of determining whether to compensate an image using an array-type image forming apparatus, the method including determining the image density of each line on a page and determining whether to compensate image density by comparing the determined image density of each line with at least one threshold value.

The foregoing and/or other aspects and utilities of the present general inventive concept may be achieved by providing a computer readable storage medium containing a method to determine whether to compensate an image using an array-type image forming apparatus, the method including determining the image density of each line on a page and determining whether to compensate image density by comparing the determined image density of each line with at least one threshold value, from data read from a digital storage medium.

BRIEF DESCRIPTION OF THE DRAWINGS

These and/or other aspects and utilities of the present general inventive will become apparent and more readily appreciated from the following description of the embodiments, taken in conjunction with the accompanying drawings of which.

DETAILED DESCRIPTION OF THE PREFERRED EMBODIMENTS

Figure 1A:
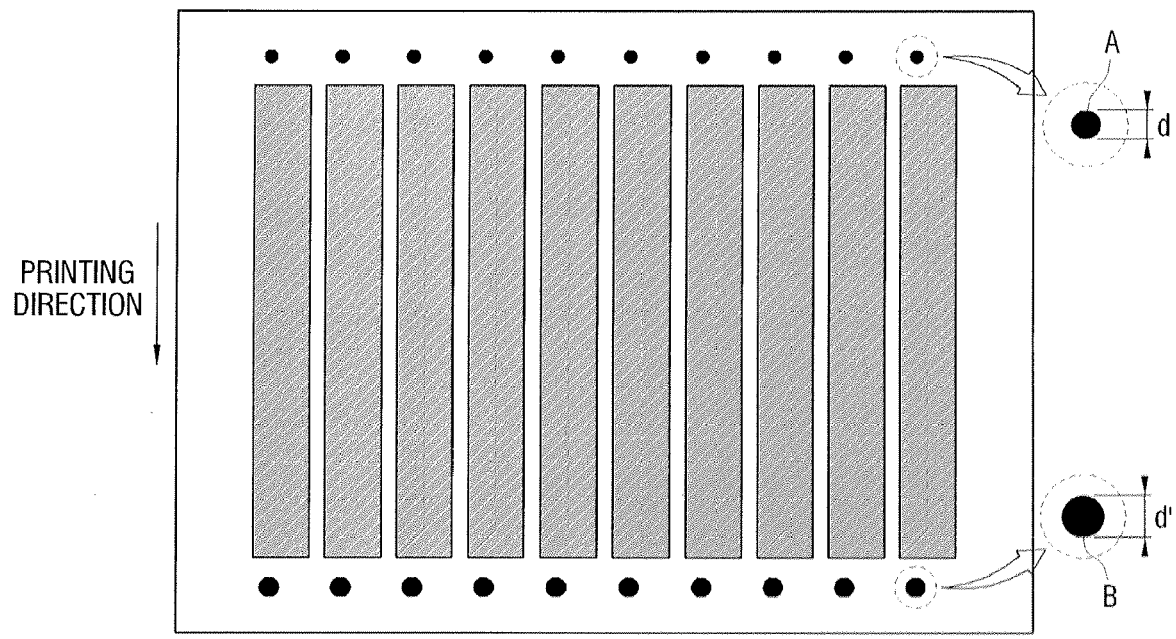
FIGS. 1A and 1B illustrate image degradation in a conventional array-type image forming apparatus.
Figure 1B:
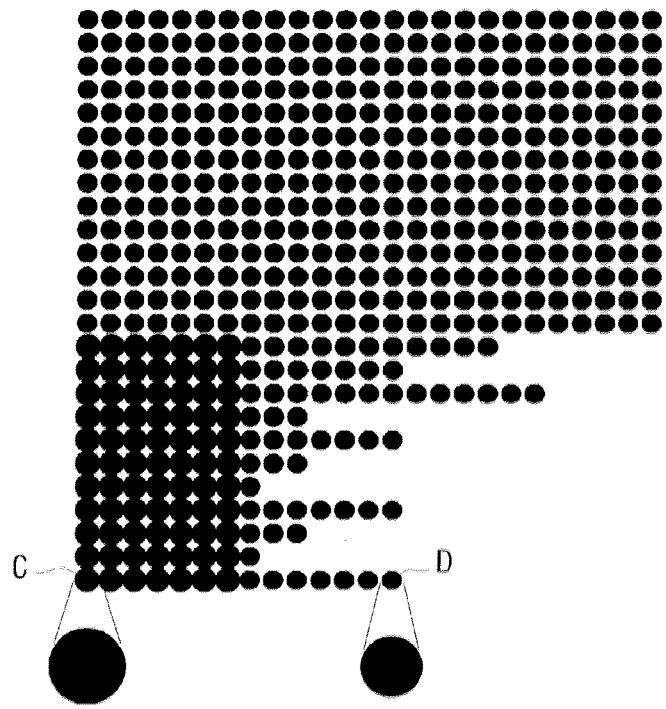

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

Figure 2:
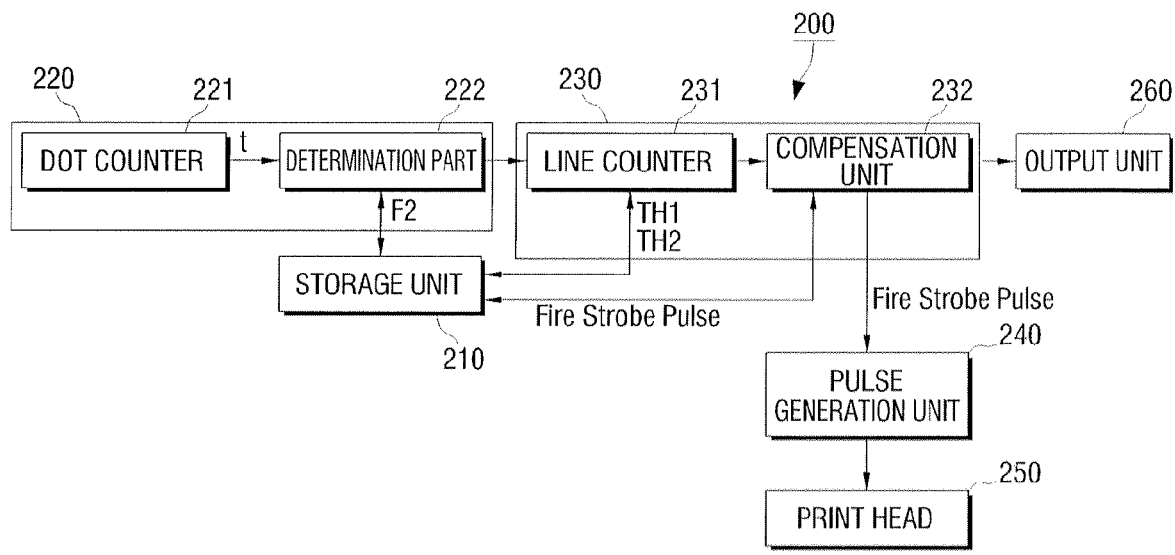
FIG. 2 is a schematic block diagram illustrating a configuration of an array-type image forming apparatus which compensates an image according to an exemplary embodiment of the present general inventive concept.

FIG. 2 is a schematic block diagram illustrating a configuration of an array-type image forming apparatus 200 according to an exemplary embodiment of the present general inventive concept.

As illustrated in FIG. 2, the array-type image forming apparatus 200 which performs printing line by line by heating a plurality of nozzles 253 (see FIG. 3) on a print head 250 includes a storage unit 210, an image density determination unit 220, a control unit 230, a pulse generation unit 240, the previously referenced print head 250, and an output unit 260.

The pulse generation unit 240 applies power to the print head 250 according to a fire strobe pulse provided from the control unit 230, and the print head 250 generates heat using the power, so that ink is sprayed from each nozzle 253 onto paper as dots.

The storage unit 210 stores a reference value F2 on which image density is determined to be high or low for a given horizontal line, and also stores threshold values TH1 and TH2 to determine whether to adjust the fire strobe pulse. The first threshold value TH1 is the threshold number of horizontal lines having high image density, and the second threshold value TH2 is the threshold number of horizontal lines having low image density.

When printing starts, the image density determination unit 220 determines whether the image density of each line is high or low based on the reference value F2 stored in the storage unit 210. Accordingly, the image density determination unit 220 includes a dot counter 221 and a determination part 222.

Figure 5:
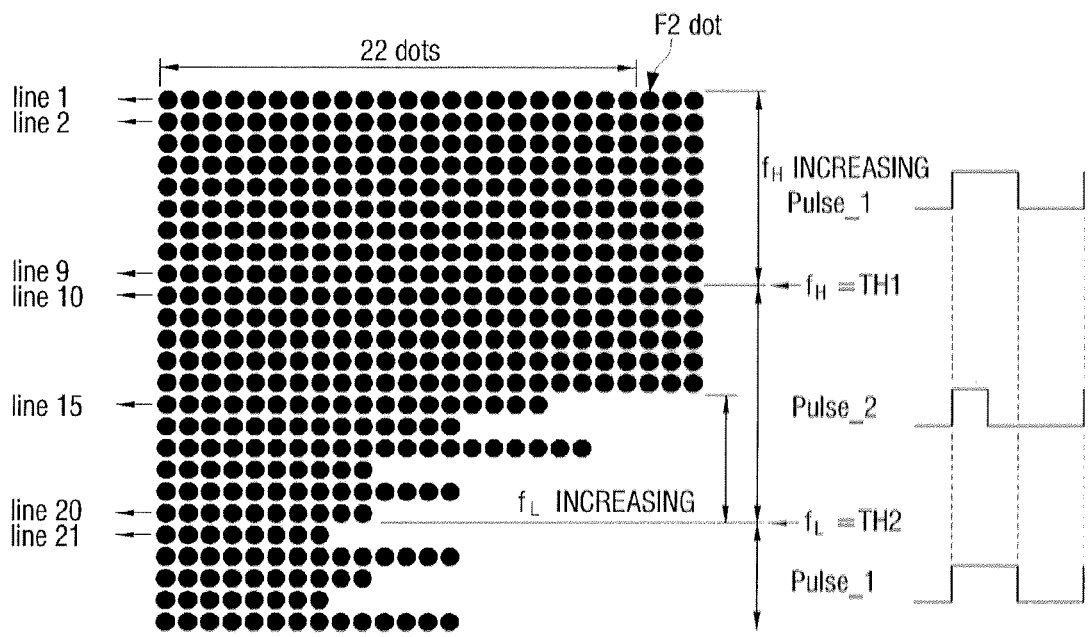
FIG. 5 illustrates an example of outputting a fire strobe pulse which is compensated by a compensation unit of FIG. 2.

The dot counter 221 counts a number, t, of dots printed on each horizontal line on each page), and outputs the counted number t of dots for each line to the determination part 222. By way of example, FIG. 5 illustrates a page with a total of 25 lines. On lines 1 through 14, t has a value of 25 dots. On line 15, t has a value of 18 dots, etc.

The determination part 222 determines that a line has a high image density if the counted number t of dots is higher than the stored reference value F2, or a low image density if the counted number t of dots is lower than the reference value F2, and outputs the determination results to the control unit 230. In the example illustrated in FIG. 5, F2 equals 23 dots, so a high image density determination is made for 24 or 25 dots while a low image density determination is made is made for 22 dots or less. At the top of FIG. 5, the first 22 dots are indicated by arrows at both ends and immediately to the right, the "F2" dot is indicated, i.e. the $23^{rd}$ dot in line 1.

For a more realistic example, if the maximum number of dots that can be printed in a line is 1000, and the reference value F2 is 760, and the number t of dots which are printed on a given line is higher than 760, then the determination part 222 determines that the line has a high image density, and outputs a determination signal "1" to the control unit 230. If the number t of dots which are printed on a given line is lower than 760, the determination part 222 determines that the line has a low image density, and outputs a determination signal "0" to the control unit 230. This is done immediately after each line is completed, i.e. when it is the currently last completed line. This process may be performed iteratively for each line until a given page is complete.

The control unit 230 compares the image density of each line as determined by the determination part 222 with the threshold values stored in the storage unit 210 in order to compensate the image density. In greater detail, the control unit 230 compensates the image by changing a duty rate of the fire strobe pulse. The duty rate is appropriately changed by comparing a dynamic value, $f_H$, of lines having a high image density with a first threshold value TH1, and also by comparing a dynamic value, $f_L$, of lines having a low image density with a second threshold value TH2. Accordingly, the control unit 230 includes a line counter 231 and a compensation unit 232.

The line counter 231 counts the number $f_H$ of lines having an image density higher than the reference value F2, and the number $f_L$ of lines having an image density lower than the reference value F2, and outputs the counted results to the compensation unit 232.

More specifically, if the number $f_H$ of lines having an image density higher than the reference value F2 reaches the first threshold TH1 which is stored in the storage unit 210, the line counter 231 outputs a counted result of "1," to the compensation unit 232, indicating that the first threshold TH1 has been reached. That is, the line counter 231 counts the number $f_H$ of lines having a high image density by incrementing the value of $f_H$ each time the determination signal "1" is output from the determination part 222, and then outputs the counted result "1" to the compensation unit 232 if the number $f_H$ of lines having a high image density reaches the first threshold TH1.

In addition, if the number $f_L$ of lines having an image density lower than the reference value F2 reaches the second threshold TH2 which is stored in the storage unit 210, the line counter 231 outputs the counted result "0" to the compensation unit 232. That is, the line counter 231 counts the number $f_L$ of lines having a low image density by incrementing the value of $f_L$ each time the determination signal "0" is output from the determination part 222, and then outputs the counted result "0" to the compensation unit 232 if the number $f_L$ of lines having a low image density reaches the second threshold TH2.

If the counted number $f_H$ or $f_L$ of lines reaches the first threshold TH1 or the second threshold TH2, respectively, the counted number $f_H$ or $f_L$ of lines is reset by the control unit 230. If a current page is completely printed, $f_H$, $f_L$ and t, as well as the number of lines counted by the line counter 231, are all reset by the control unit 230. Consequently, the image forming apparatus 200 cools down the head chips until the next page starts being printed. If the next page starts being printed, the line counter 231 restarts the counting process from 0, for the number $f_H$ or $f_L$ of lines with high or low image density (i.e. respectively, t>F2 or t<F2).

For example, if lines having a high image density are successively counted until the first threshold value TH1 is reached, or the number $f_H$ of lines counted in a particular area reaches the first threshold value TH1, the line counter 231 can output the counted result "1" to the compensation unit 232. This counted result "1" signals to the compensation unit 232 that modifying the strobe pulse by shortening the duty cycle is now appropriate. Conversely, if the number $f_L$ of lines counted in a particular area reaches the second threshold value TH2, the line counter 231 may be designed to output the counted result "0" to the compensation unit 232. It will be readily appreciated that the threshold values may be met by successive lines of one particular determination signal ("1" for high image density or "0" for low image density). The apparatus 200 in this particular embodiment of the general inventive concept, is configured so that a given threshold value can also be reached by non-successive lines. For example, lines 1 through 9 on a particular page could all be high image density, so that at the end of 9 lines, the value of $f_H$ is 9. But line 10 has a low image density. Line 11 also has a high image density, so that the value of $f_H$ is incremented to 10 as a result. The group of lines of high image density in this case is non-successive (i.e. not ten in a row) and yet apparatus 200 is designed in this case to still register the count result of "1" and subsequently change the strobe pulse appropriately. In another embodiment, it will readily be appreciated that apparatus 200 could be configured to implement a strobe pulse change only after successive lines with a consistent determination signal equal to either of the respective thresholds, TH1 and TH2.

Figure 3:
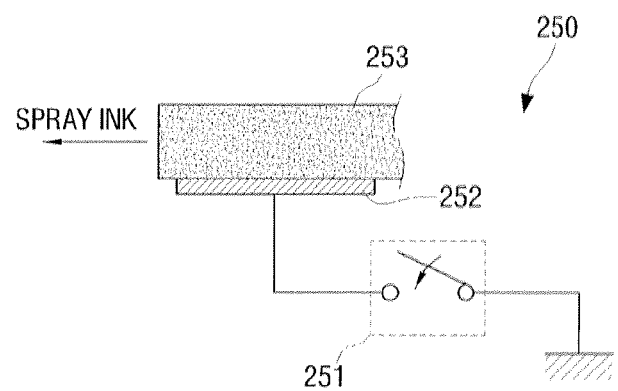
FIG. 3 briefly illustrates the print head of FIG. 2.

Referring to FIGS. 2 and 3, the compensation unit 232 adjusts a fire strobe pulse whenever the counted result 1 or 0 is output from the line counter 231, indicating that the image density needs to be compensated. For example, if the counted result 1 is input, the compensation unit 232 lowers the heat supplied to the nozzles 253 of the head 250 since the size of printed dots has increased or is likely to momentarily increase due to excessively heated nozzles 253. Subsequently, the compensation unit 232 outputs a fire strobe pulse having a duty ratio reduced in order to lower the amount of heat supplied by the pulse generation unit 240 to the print head 250. The fire strobe pulse having a reduced duty ratio lowers the temperature of the heater 252 by providing a shorter time during which the switch 251 is turned on than that of a previous fire strobe pulse and a longer time during which the switch 251 is turned off than that of the previous fire strobe pulse, and thus the temperature of the head chip is lowered.

Alternatively, if the counted result "0" is input, the compensation unit 232 raises the heat supplied to the nozzles 253 of the head 250 since the size of the printed dots has decreased or is likely to momentarily decrease due to the nozzles 253, which are not heated to an appropriate temperature. Subsequently, the compensation unit 232 outputs a fire strobe pulse having a duty ratio that is increased to raise the heat to the pulse generation unit 240. The fire strobe pulse having an increased duty ratio raises the temperature of a heater 252 by providing a longer time during which the switch 251 is turned on than that of a previous fire strobe pulse and a shorter time during which the switch 251 is turned off than that of the previous fire strobe pulse, and the temperature of the head chip is thus increased.

The compensation unit 232 determines the duration of the fire strobe pulse by referring to a look-up table that can be pre-stored in the storage unit 210.

Figure 4:
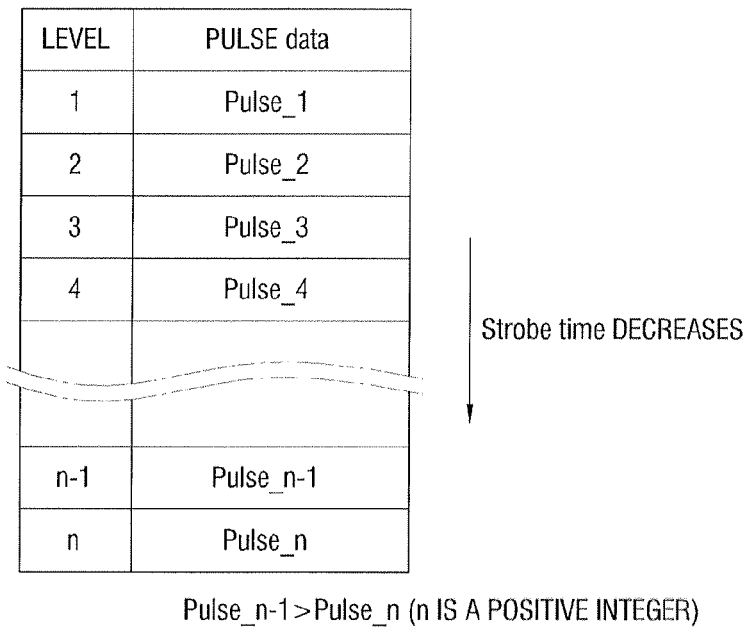
FIG. 4 illustrates a method of determining a fire strobe pulse using a look-up table.

FIG. 4 illustrates a method to determine a fire strobe pulse using the look-up table described above. The look-up table of FIG. 4 includes appropriate fire strobe pulses determined according to the printing quantity for each of a plurality of levels. As the level increases, the strobe time of the fire strobe pulse decreases. A strobe time is a time during which a fire strobe pulse is turned on. Accordingly, if the size of dots is determined to increase during printing, the compensation unit 232 checks the fire strobe pulse of a subsequent level on the look-up table, and outputs it to the pulse generation unit 240.

For example, if printing is being performed using a first fire strobe pulse Pulse_1 of level 1, and the size of dots is determined to increase when printing continues using the first fire strobe pulse Pulse_1, the compensation unit 232 confirms the second fire strobe pulse Pulse_2 of level 2 on the look-up table, and outputs it to the pulse generation unit 240. Conversely, if the size of dots is determined to decrease when printing continues using the second fire strobe pulse Pulse_2, the compensation unit 232 confirms the first fire strobe pulse Pulse_1 of previous level 1 on the look-up table, and outputs it to the pulse generation unit 240.

The pulse generation unit 240 supplies power to the switch 251 (see FIG. 3) to heat the nozzle 253 of the print head 250 based on the fire strobe pulse. When initial printing starts, the pulse generation unit 240 supplies power to the switch 251 based on a default fire strobe pulse or a fire strobe pulse corresponding to a print control signal.

The default fire strobe pulse and the fire strobe pulse corresponding to a print control signal can be stored in the storage unit 210 in the form of a look-up table illustrated in FIG. 4. The print control signal is a signal which is converted into a format printable by operations such as half-toning and rendering, and indicates whether each dot is printed on a respective pixel. When the pulse generation unit 240 receives a fire strobe pulse selected by the compensation unit 232 during the printing operation, the pulse generation unit 240 supplies power corresponding to the selected fire strobe pulse via the switch 251.

The pulse generation unit 240 selectively drives the switch 251 and the heater 252 according to a particular print control signal and a fire strobe pulse input from the pulse generation unit 240, so ink is sprayed on a recording medium according to the print control signal. Referring to FIG. 3, the print head 250 includes the nozzle 253, the heater 252, and the switch 251. In general, the print head 250 includes a plurality of nozzles 253, heaters 252, and switches 252, but FIG. 3 illustrates a print head 250 which is implemented with only one of each for convenience of description.

The switch 251 is operated using power supplied from the pulse generation unit 240, and the power is then supplied to the heater 252. The heater 252 generates heat when the switch 251 is turned on, and heats the nozzle 253, which sprays ink onto the paper. The temperature for heating the nozzle 253 depends on the selected fire strobe pulse.

If a fire strobe pulse having a reduced duty rate is input from the compensation unit 232 when printing an area having a high image density, the pulse generation unit 240 reduces the heating time of the heater 252, and thus the heating temperature of the nozzle 253 falls and the dots are prevented from increasing in size. Consequently, a dot of an appropriate size can be printed.

Alternatively, if a fire strobe pulse having a raised duty rate is input from the compensation unit 232 when printing an area having a low image density, the pulse generation unit 240 increases the heating time of the heater 252 and thus the heating temperature of the nozzle 253 rises. Consequently, a dot of an appropriate size can be printed.

The control unit 230 operates the output unit 260 to notify the user that the image is currently compensated. The output unit 260 may be implemented as a display unit which displays a message or a light emitting diode (LED) indicating that the image is currently compensated, or as a printing engine which prints the message onto paper.

FIG. 5 illustrates an example of outputting a fire strobe pulse determined by the compensation unit 232 of FIG. 2. In FIG. 5, t indicates the number of dots printed in a given horizontal line and F2 indicates a reference value (23 dots in this example) stored in the storage unit 210 based on which the image density is determined to be high or low. The value $f_H$ indicates the number of lines satisfying the dynamic condition t>F2, and $f_L$ indicates the number of lines satisfying the dynamic condition t<F2. TH1 and TH2 indicate a first and second threshold value stored in the storage unit 210 (e.g. TH1=10 and TH2=6). For clarity of illustration, FIG. 5 is a small configuration of lines and dots. The total number of lines illustrated is 25. The maximum number of dots per line is also 25 (e.g. the value of t for lines 1 through 14 is 25 dots, while the value of line 15 is 18 dots). It will be readily appreciated by those skilled in the art that the general inventive concept will usually be implemented on a much larger scale, in terms of maximum printed dots per line and the associated parameters, such as F2, etc., and possibly other aspects of scale such as lines per page.

Referring to FIGS. 4 and 5, lines 1 to 10 are printed using the first fire strobe pulse Pulse_1. Since the number t of dots (25) printed in line 1 is greater than the reference value F2 (23 dots), the determination part 222 outputs the determination signal "1" for h line 1 to the line counter 231, and the line counter 231 counts the number of determination signals "1" as print head 250 subsequently addresses each line. That is, since the number t of dots in each of lines 1 to 10 is greater than the reference value F2, the line counter 231 counts the determination signal "1" each of ten consecutive times. Since the number of counted determination signals "1" reaches 10, which is the first threshold value TH1, the line counter 231 outputs the counted result "1" to the compensation element 232, which means the current strobe pulse duty cycle must be compensated, i.e., modified. The value for $f_H$ is also reset to "0."

When the compensation unit 232 determines that the current strobe pulse must be compensated (on the basis that TH1 has been met). If printing continues using the first fire strobe pulse, the image density will be higher than the image density intended for normal use. Accordingly, the compensation unit 232 outputs the second fire strobe pulse Pulse_2 to the pulse generation unit 240 so as to effectively modify the duty rate of the first fire strobe pulse. That is, the compensation unit 232 confirms the second fire strobe pulse Pulse_2 having a reduced duty rate on the look-up table, and outputs the second fire strobe pulse Pulse_2 to the pulse generation unit 240. The pulse generation unit 240 starts printing line 11 using the second fire strobe pulse Pulse_2, which has a shorter duty rate (compare the first and second pulse graphics on the right-hand side of FIG. 5).

After the compensation unit 232 has outputted second fire strobe pulse Pulse_2 and the values t and $f_H$ have been reset, the dot counter 221 counts the number of dots printed in each line starting from line 11, and outputs the counted number of dots to the determination part 222. Since the number t of dots printed on line 15 is lower (18) than the reference value F2 (23), the determination part 222 outputs the determination signal "0" to the line counter 231. That is, the determination part 222 outputs determination signal "0" from line 15 to line 20 to the line counter 231, and the line counter 231 counts the number of lines of the determination signal "0" by sequentially incrementing and storing the dynamic value for $f_L$ after each low image density line is completed and the updated determination signal received. If the number of counted determination signals "0" reaches six, which is the second threshold value TH2, the line counter 231 outputs the counted result "0" to the compensation unit 232 and then resets the dynamic value of $f_L$ to "0."

Therefore, the compensation unit 232 determines that the image density between line 15 and line 20 is low (on the basis that TH2 has been met). If printing continues using the second fire strobe pulse, the image density will be lower than the image density intended by a print control signal. Accordingly, the compensation unit 232 outputs the first fire strobe pulse Pulse_1 to the pulse generation unit 240 so as to effectively modify the duty rate of the second fire strobe pulse Pulse_2. That is, the compensation unit 232 outputs the first fire strobe pulse Pulse_1 having a raised duty rate to the pulse generation unit 240 so as to increase the heat provided to the nozzle 253.

This is because the look-up table stores the fire strobe pulses in order from a fire strobe pulse having a high duty rate to a fire strobe pulse having a low duty rate, that is, the first fire strobe pulse Pulse_1, the second fire strobe pulse Pulse_2, the third fire strobe pulse Pulse_3, etc. Therefore, beginning with "line 21" in FIG. 5, ink is sprayed from the nozzle 253 heated using the first fire strobe pulse Pulse_1. Consequently, by adjusting the fire strobe pulse adaptively according to the image density, the problem of degradation caused by increasing or decreasing dot size can be solved.

If the determination part 222 outputs a determination signal "1" successively from line 15 to line 24 (i.e. for lines 15 to 24, t>F2), the compensation unit 232 compensates the second fire strobe pulse Pulse_2 to output the third fire strobe pulse Pulse_3 since the determination signal is successively counted to 10. Note that this is the opposite of the case illustrated in FIG. 5, where determination element 222 outputs a determination signal "0" successively from line 15 to 24, because for each such line, t<F2.

Figure 6:
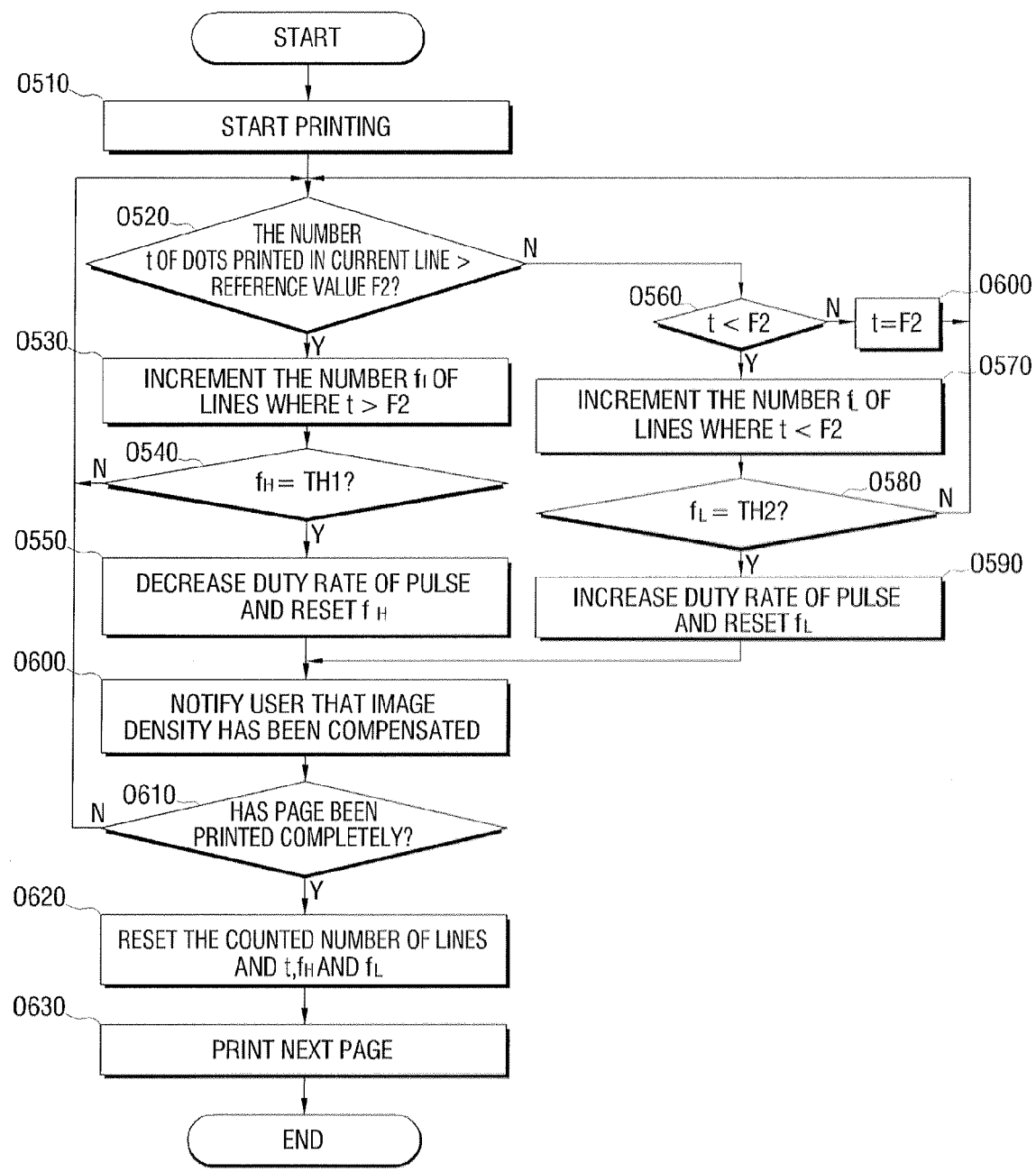
FIG. 6 is a flowchart illustrating a method of compensating an image using the array-type image forming apparatus of FIG. 2.

FIG. 6 is a flowchart illustrating a method of compensating an image using the array-type image forming apparatus of FIG. 2.

Referring to FIGS. 2 to 6, if printing is initiated using a print control signal and an initial fire strobe pulse at operation 510, the dot counter 221 counts the number t of dots printed in the first line and the determination part 222 determines whether the counted number t of dots is higher than the pre-stored reference value F2, at operation 520. In operation 520, the dot counter 221 continues counting the number t of dots in each line and iteratively outputs the counted result to the determination part 222.

In operation 520, if the counted number t of dots is higher than the pre-stored reference value F2, the determination part 222 outputs a determination signal "1" to the line counter 231, and the line counter 231 increments the dynamic value of $f_H$, at operation 530. In other words, the line counter 231 calculates the dynamic value of $f_H$ by sequentially incrementing that value each time it receives the input determination signal "1".

If the value $f_H$ reaches the first threshold value TH1, at operation 540, the compensation unit 232 confirms a compensated fire strobe pulse on the look-up table and outputs the compensated fire strobe pulse (i.e. with a decreased duty rate) to the pulse generation unit 240, at operation 550. For example, initially printing is begun using the first fire strobe pulse Pulse_1 at operation 510 and then iteratively at operations 520, 530 and 540 (with a "NO" result each time at operation 540, i.e. $f_H$<TH1). Then later at operation 540 the value of $f_H$ is determined to be equal to TH1 and then at operation 550 the compensation unit 232 confirms selection of the second fire strobe pulse Pulse_2 having the duty rate lower than the first fire strobe pulse Pulse_1 on the look-up table, and outputs the second fire strobe pulse Pulse_2 to the pulse generation unit 240.

Alternatively, in operation 520, if the counted number t of dots is determined to be lower than the pre-stored reference value F2, operation 560, the determination part 222 outputs a determination signal "0" to the line counter 231, and the line counter 231 increments the dynamic value of $f_L$ at operation 570. In this fashion, the line counter 231 iteratively keeps track of the current value of $f_L$.

If the value $f_L$ of determination signals "0" reaches the second threshold value TH2 at operation 580, the compensation unit 232 confirms a compensated fire strobe pulse on the look-up table and outputs the compensated fire strobe pulse to the pulse generation unit 240 at operation 590. For example, if printing is performed using the third fire strobe pulse Pulse_3 in operation 510, the compensation unit 232 confirms the second fire strobe pulse Pulse_2 having a duty rate higher than the third fire strobe pulse Pulse_3 on the look-up table, and outputs the confirmed fire strobe pulse to the pulse generation unit 240.

When the value of $f_H$ is less than the first threshold value TH1 in operation 540, the value of $f_L$ is less than the second threshold value TH2 in operation 590, and the value of t is equal to the pre-stored reference value F2, the pulse generation unit 240 supplies the current strobe pulse used in operation 510 to the print head 250.

After operation 550 or 590, the output unit 260 notifies the user that the image is being compensated by displaying the message on the screen or printing the message on paper at operation 600.

If the current page has been printed completely (see operation 610), the line counter 231 resets the counted values for t, $f_H$ and $f_L$ (see operation 620), and starts printing the next page (see operation 630). In operation 630, the line counter 231 renews incrementing and storing the dynamic values for t, $f_H$ and $f_L$ starting from line 1. Note that all numerical examples are illustrative only. Design choices including but not limited to materials and pulse length will play a role in determining the optimum parameter values for F2, $f_H$, $f_L$ and the like.

As described above, the present general inventive concept provides an array-type image forming apparatus and a method for compensating an image using the same. In such an array-type image forming apparatus, the image density is determined using the number of dots printed on each line, and the duty rate of a fire strobe pulse to drive a nozzle is compensated according to the determined image density, so degradation of image quality can be prevented. In particular, the change in the image density caused by image degradation in a head chip which is temperature-sensitive is predicted using lines, and a fire strobe pulse is compensated, so these can generate images uniformly.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electromagnetic field, RF network, etc.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An array-type image forming apparatus, comprising:
   an image density determination unit to determine the image density of each line on a page;
   a storage unit to store one or more threshold values to determine whether to compensate image density on the page; and
   a control unit to determine whether to compensate the image density by comparing the determined image density of each line and the threshold value, and compensating the image density on the page according to the comparison result,
   wherein the storage unit stores a reference value based on which the image density of each line is determined to be high or low, a first threshold value which is the allowable number of lines, having a high image density, and a second threshold value which is the allowable number of lines having a low image density.

2. The apparatus of claim 1, wherein the control unit counts the number of lines having an image density higher than the reference value, and compensates the image density if the counted number of lines reaches the first threshold value.

3. The apparatus of claim 2, wherein the control unit compensates the image density if there are lines having a high image density which are repeated successively until the first threshold value is counted, or if the number of lines having a high image density in a certain area reaches the first threshold value.

4. The apparatus of claim 2, wherein the control unit resets the counted number of lines if one page has been printed completely.

5. The apparatus of claim 1, wherein the control unit counts the number of lines having an image density lower than the reference value, and compensates the image density if the counted number of lines reaches the second threshold value.

6. The apparatus of claim 5, wherein the control unit compensates the image density if there are lines having a low image density which are repeated successively until the second threshold value is reached, or if the number of lines having a low image density in a certain area reaches the second threshold value.

7. The apparatus of claim 1, wherein the control unit compensates the image density by changing a fire strobe pulse.

8. The apparatus of claim 1, further comprising an output unit to notify a user that the image has been compensated by displaying or printing a message.

9. The array-type image forming apparatus of claim 1, wherein the array-type image forming apparatus ejects ink to form an image on the page, and
the control unit compensates the image density on the page by adjusting a size of ink droplets onto the page.

10. A method to compensate an image using an array-type image forming apparatus, the method comprising:
determining the image density of each line on a page;
comparing the determined image density of each line with at least one threshold value to determine whether to compensate image density on the page; and
compensating the image density on the page according to the comparison result,
wherein in the compensating operation, the number of lines having an image density higher than the reference value is counted, and the image is compensated if the counted number of lines reaches a first threshold value, and
wherein the first threshold value is the allowable number of lines having a high image density.

11. The method of claim 10, wherein in the compensating operation, the image is compensated if there are lines having a high image density which are repeated successively until the first threshold value is reached, or if the number of lines having a high image density in a certain area reaches the first threshold value.

12. The method of claim 10, wherein in the compensating operation, the number of lines having an image density lower than the reference value is counted, and the image is compensated if the counted number of lines reaches a second threshold value,
wherein the second threshold value is the allowable number of lines having a low image density.

13. The method of claim 12, wherein in the compensating operation, the image is compensated if there are lines having a low image density which are repeated successively until the second threshold value is reached, or if the number of lines having the low image density in a certain area reaches the second threshold value.

14. The method of claim 10, further comprising resetting the counted number of lines if one page has been printed completely.

15. The method of claim 10, wherein in the compensating operation, the image has been compensated by changing a fire strobe pulse.

16. The method of claim 10, further comprising notifying a user that the image is compensated, by displaying or printing a message.

17. The method of claim 10, wherein compensating the image density includes adjusting an ink dot size of ink dots that form the image.

18. A method of determining whether to compensate an image using an array-type image forming apparatus, the method comprising:
determining the image density of each line on a page;
determining whether to compensate image density by comparing the determined image density of each line with at least one threshold value; and
compensating the image density on the page according to the comparison result,
wherein in the compensating operation, the number of lines having an image density higher than the reference value is counted, and the image is compensated if the counted number of lines reaches a first threshold value, and
wherein the first threshold value is the allowable number of lines having a high image density.

19. The method of claim 18, further comprising:
compensating the image density based on the comparison.

20. The method of claim 18, wherein determining the image density of each line includes counting one or more dots, to arrive at a number of the total dots counted for each line.

21. The method of claim 20, wherein determining the image density of each line further includes comparing the total dots counted for each line to a reference value.

22. The method of claim 21, wherein determining whether to compensate image density includes counting a number of lines such that the total dots counted for each line is greater than the reference value.

23. The method of claim 21, wherein determining whether to compensate image density includes counting a number of lines such that the total dots counted for each line is less than the reference value.

24. An array-type image forming apparatus, comprising:
an image density determination unit to determine the image density of each line on a page;
a storage unit to store one or more threshold values to determine whether to compensate image density of ink droplets on the page; and
a control unit to determine whether to compensate the image density by comparing the determined image density of each line and the threshold value,
wherein the storage unit stores a reference value based on which the image density of each line is determined to be high or low, a first threshold value which is the allowable number of lines having a high image density, and a second threshold value which is the allowable number of lines having a low image density.

25. A method to compensate an image using an array-type image forming apparatus, the method comprising:
determining the image density of each line on a page; and
compensating the image density by comparing the determined image density of each line with at least one threshold value to determine whether to compensate image density at each line, wherein in the compensating operation, the number of lines having an image density higher than the reference value is counted, and the image density is compensated if the counted number of lines reaches a first threshold value, and wherein the first threshold value is the allowable number of lines having a high image density.

* * * * *